3,107,150
METHOD FOR IMPROVING THE WHITENESS OF TiO-PIGMENT MATERIAL MINUTELY CONTAMINATED WITH CARBONACEOUS MATTER
Albert H. Angerman, Wilmington, Del., assignor to E. I. du Pont de Nemours and Company, Wilmington, Del., a corporation of Delaware
Filed Jan. 30, 1959, Ser. No. 790,233
2 Claims. (Cl. 23—202)

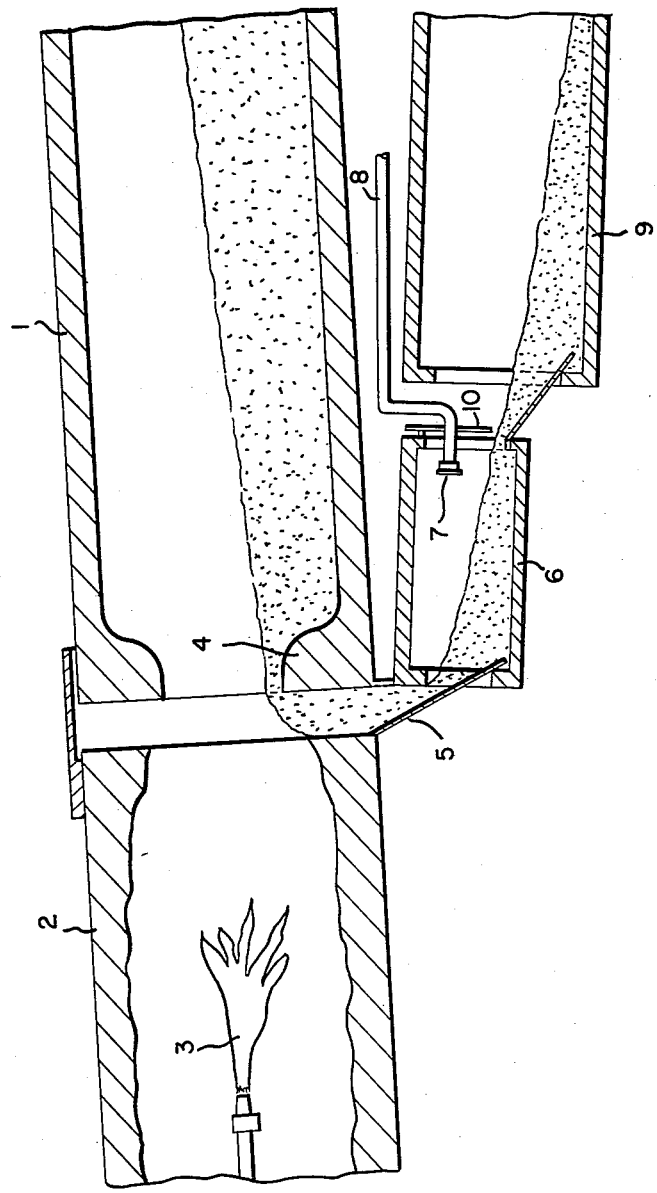

This invention pertains to improvements in the manufacture of white, calcined pigment materials. More particularly, it pertains to a treatment which results in improved whiteness of titanium dioxide pigments.

Titanium dioxide pigments are the most widely used and whitest of the white pigments in today's commerce. This class of pigments includes the substantially pure products in both the anatase and rutile forms as well as these products extended with such materials as clay, barium sulfate, calcium sulfate, calcium carbonate, silica, etc. There are two well known commercial processes for preparing titanium dioxide of pigment quality. The older one, known as the sulfate process, involves attacking the ore, usually ilmenite, with strong sulfuric acid to dissolve it and form a sulphuric acid solution. This solution is clarified by sedimentation and filtration usually with the help of various coagulating and precipitating agents, some of which are organic in nature. The clarified solution is then adjusted with respect to its concentration, subjected to hydrolysis by boiling in the presence of specially prepared colloidal seed, filtered, washed, calcined at temperatures ranging from 800° C. to as high as 1200° C., and ground to fine powder for use. The seed and other additives used function to determine the crystal type of the calcined $TiO_2$ which may be either anatase or rutile. Minor treating agents as well as the major portions of extenders may be added at various steps during this process. The second manufacturing method involves the burning or oxidation of titanium tetrachloride with air to produce titanium dioxide. A product of this burning step is usually of pigment quality since the oxidation step occurs at temperatures in the calcination range. It is, however, sometimes recalcined to remove residual chlorine and as a means of accomplishing certain after-treatments.

The raw sulfate titanium dioxide pigments are fed, usually in a form of wet filter cake, to the cool end of the continuous rotary calciner. The calciner is usually internally heated by an air-oil flame near the lower or hot end where the calcined pigment is discharged. The raw titanium dioxide feed usually contains several percent of adsorbed sulfuric acid in addition to the water and these components are evaporated and driven off as the charge moves into the hotter zones, substantially all the water and sulfuric acid being driven off by the time the pigment temperature reaches a range of 400° C.–600° C. The dry pigment is then further heated to around 900° C.–1100° C. to develop the proper particle size and pigment properties. This calcination is carried out under so-called oxidizing conditions; that is, there is a considerable excess of air supplied with the oil flame and as secondary air. The oxidizing atmosphere is employed to prevent the reduction of titanium dioxide to lower oxides which are dark or bluish in color and relatively unstable. It is believed, too, that the major portion of any organic residues left in the pigment are burned out during this oxidizing calcination.

Although the product of these commercial processes is of high brightness and exhibits excellent pigment properties in general, it has been found that a unique supplementary oxidizing treatment will give a marked improvement to the color and whiteness of the present product. The lack of maximum whiteness in the products seems to be due to the presence of some residual carbonaceous matter. It has been found by mass spectrographic analysis of the combustion products of the pigment and from examination of the residues left on solution in hydrofluoric acid that a small yet deleterious amount of carbonaceous matter exists in the calcined pigment which is apparently not burned out by the usual calcination of several hours' duration in the presence of air. This contamination may be elemental carbon or partially charred organic matter.

It is therefore an object of this invention to purify and improve the whiteness level in a white, calcined, titanium-dioxide-containing pigment material. It is a further object to effect this improvement by the oxidative removal of any residual carbonaceous material. It is also an object to effect economy in this treatment by combining the new treatment with the calcination operation in order to save heat.

The objects of this invention are accomplished by a process which improves the whiteness of an inorganic titanium-dioxide-containing white pigment material by removing therefrom minute, discoloring amounts of carbonaceous matter that cannot be removed by calcining the pigment in the presence of air at temperatures above 850° C. The process comprises contacting the pigment material with an atmosphere inert to the pigment material and one which has been rendered richer in oxygen than air by the addition thereto of at least one oxidizing agent selected from the group consisting of elemental oxygen, higher oxides of nitrogen (such as $NO$, $NO_2$ and $N_2O_5$), higher oxides of sulfur (such as $SO_2$ and $SO_3$), nitric acid, sulfuric acid, and oleum. This contact with the oxidizing atmosphere is done at temperatures between about 850° C. and the maximum calcination temperatures which are normally used in calcining such a pigment. Maximum calcination temperatures are usually not greater than 1200° C. The contact of the pigment with such an atmosphere causes the carbonaceous material to be converted to gaseous oxidation products which escape into the ambient atmosphere. After such treatment, the pigment can then be cooled and a whitened material recovered.

The pure vapors of one or more of these oxidizing agents may constitute the enriched oxygen atmosphere. Alternatively, the oxidizing agents may be added to the normal atmosphere present during the calcination of titanium-dioxide-containing pigments materials. Such atmosphere is usually air or air in admixture with the gases from the combustion of a hydrocarbon fuel. The oxidizing agents may be fed by known methods to the treating zone wherein the pigment is contained. Since it is not desired to have any of these added oxidizing agents ultimately left associated with the pigment material, it is preferable to replace the more oxidizing atmosphere with air prior to cooling the treated material below the temperature at which the agents condense or become adsorbed thereon. This displacement is preferably accomplished while the pigment temperature is above about 600° C. Thus, the stable gases may be supplied from pressure containers or generators. The sulfur trioxide and various acid fumes may be evaporated into the treating zone through application of heat or the liquid substances such as sulfur trioxide, sulfuric acid, oleum, nitric acid may be sprayed or otherwise introduced into the treatment zone. While such agents as sulfuric and nitric acid and $N_2O_5$ might be expected to dissociate into oxides and water at elevated temperatures, this possibility has no effect on the operability of the invention.

The amount of these oxidizing agents used relative to the amount of product treated is not great nor especially critical. For practical results, where the time of contact cannot be too long, considerable excess over the stoichiometric quantity required to oxidize the carbonaceous material is used. In most cases this will amount to at least 25% by weight of the atmosphere placed in contact with the material being treated. The effective time periods required to give desirable improvements in the pigment with reasonable quantities of reagents ranges from a few seconds to several hours, preferably in the range of from 1 to 60 minutes. The temperature of the treatment may be varied, but inasmuch as the other pigment properties are critically affected by high temperatures, it is preferred to apply the instant treatment to the pigment at temperatures corresponding to its normal maximum calcination temperature or below. Since the treatment of this invention only becomes effective at above 850° C. it is usually preferable to first subject the pigment material to at least the first stages of its normal calcination, i.e., up to 850° C. prior to contact with the special oxidizing atmosphere.

The attached drawing is a side elevation of one type of apparatus which may be used to carry out the process of this invention. This drawing is more specifically discussed hereinafter.

The following examples will illustrate certain applications of this invention, but they are not to be construed as being in limitation thereof.

EXAMPLE I

Plant kiln feed of the rutile type prepared by the sulfate process was used in this series of tests. A laboratory calciner consisting of an electrically heated and thermally controlled furnace zone in which silica calcining flasks could be mounted for heating was used. These flasks were long necked, spherical, thick walled and made of fused silica large enough to contain 1000 gms. of pigment in the spherical portion without spilling when rotated in a horizontal position. Two such flasks were horizontally mounted at the neck in a hollow journal with the spherical portion in the heating zone. Thermocouples were placed in the furnace close to the external surfaces of each flask. 1000 grams of kiln feed were placed in each flask and the flasks rotated at 3 r.p.m. during the pigment treating operation. A silica supply tube was placed in each flask and clean air admitted at 3500 cc./min. Calcination was begun and the temperature, as measured by the thermocouples, was raised to 850° C., the rate of temperature rise being decreased as the temperature rose so that upon approaching 850° C. it was 1°/min. From 850° C. to the maximum temperature the rise was at the rate of 1° C./min. The charge was then cooled, while rotating, at 5° C./min. A series of calcinations was made substituting oxygen for air in flask B at various points in the temperature cycle and continuing the oxygen flow until the charge cooled below 850° C. at which time air was again circulated while the charge cooled to room temperature. The calcined pigment samples were recovered, ground, and tested for whiteness using a well known visual method of grading against standards. The method is substantially that described in U.S. 2,253,551 and by J. E. Booge and H. E. Eastlack in the Paint, Oil, and Chemical Review, April 9, 1924. All pigments from control flask A were combined, mixed and sampled. The grading on this reference composite was 17:2Y. The first number refers to the brightness and the number preceding "Y" refers to "Points" of yellowness. The whiteness grading of pigments subject to oxygen treatment at various temperatures are shown in the following Table I against the point in the temperature cycle when the oxygen flow was started

*Effect of Oxygen on Color of Pigment*

TABLE I

| Temp. O₂ started | Whiteness |
|---|---|
| Heating Cycle, ° C.: | |
| 850 | 21:2Y |
| 900 | 20:2Y |
| 920 | 19:2Y |
| 940 | 18:3Y |
| 960 | 18:2Y |
| (965° C. max. temp. reached.) | |
| Cooling cycle, ° C.: | |
| 950 | 18:2Y |
| 940 | 18:2Y |
| 930 | 17:2Y |

EXAMPLE II

The procedure of Example I was followed using a flow of nitrogen dioxide instead of oxygen. The oxidizing gas flow was maintained during the following temperature ranges of the calcination cycle; 960° C. was the maximum temperature reached.

TABLE II

| Temp. range while NO₂ atm. was maintained, ° C. | Color |
|---|---|
| 950-960-940 | 19:2Y |
| 960-920 | 19:2Y |
| Control Pigment (Flask A air only) | 17:3Y |

EXAMPLE III

A sample of sulfate process anatase titanium dioxide was treated substantially as in Examples I and II but using SO₃ as the oxidant during the cooling portion of the calcination cycle. The SO₃ was supplied by adding oleum to a hot silica tube leading into the flask. The tube was kept hot enough to flash evaporate the oleum to contact the pigment presumably as a mixture of SO₃ and H₂SO₄. Air was passed through the flask at the end of the SO₃ treatment period to remove the acid vapors before cooling to 600° C. The cooling in the air was continued to room temperature.

TABLE III

| Temp. range while SO₃ atm. was maintained, degrees | Color |
|---|---|
| 960 to 900 | 22:3Y |
| 960 to 920 | 21:2Y |
| 960 to 930 | 20:2T |
| Control (Flask A air only) | 19:1Y |

EXAMPLE IV

An arrangement was set up adjacent to a commercial titanium pigment kiln whereby a small portion of the calcined pigment could be discharged into a small ceramic lined, insulated, electrically heated vessel. The function of this vessel was to hold the kiln discharge at elevated temperatures in the presence of the oxidizing agent of this invention for extended periods. The vessel measured 4 inches in diameter by 24 inches high internally. A small hole near the bottom was provided to admit the agent, and a cover with a small vent was used to close the treating space. At each test the vessel was brought up to the desired temperature range before receiving the pigment. In one series of tests, as soon as the vessel was charged with pigment, a flow of oxygen was provided to the reagent port. Two oxygen rates were employed; the medium rate slowly displaced the air in the sample giving an average of about ½ atmosphere partial pressure of oxygen in the atmosphere. The second rate was high, displacing most of the air in less than about 5 min. Both rutile and anatase pigment were treated and the brightness of the resulting pigment compared with the corresponding product from the normal cooling step. Also in this series a test of $SO_3$ was made by injecting oleum instead of $O_2$. As in Example III, air was used to displace the $SO_3$ after treatment before cooling below 600° C. Table IV indicates the result.

TABLE IV

| Time of treatment, minutes | Pigment temp., °C. | $O_2$ flow rate | Brightness improvement | |
|---|---|---|---|---|
| | | | Rutile | Anatase |
| 30 | 860–780 | High | 1 point | 1–2 |
| 60 | 930–760 | Med | 1–2 points | 4 |
| 60 | 900–850 | High | 2 points | 5 |
| 20 | 1,000–900 | High | 1 point | 4 |
| 60 | 800–750 | Med | | 0 |
| | | Oleum added at— | | |
| 15 | 900–800 | 1 cc./5 min. 1 | | 3 |
| 60 | 950–850 | 1 cc./5 min. 2 | | 5 |

It is evident from these experiments that anatase is improved to a greater extent than rutile by this treatment. This is usually true since the higher hiding power and inherently lower whiteness makes the rutile less susceptible to the effect of dark colored contaminants. Nevertheless, the slight improvement of rutile is a valuable one extending its use in compositions where excellent whiteness is demanded. In Example I the lack of color improvement at temperatures below 930° C. is doubtless due to the short time of treatment of 16 minutes or less. However, Example IV shows that the treatment is effective down to 850° C. when the time of treatment is extended.

The process of this invention is adaptable to commercial operation by an arrangement of apparatus shown in part in the attached drawing. In the large scale calcination of $TiO_2$ from the sulfate process the raw pigment in the form of wet filter cake is fed into the higher and cooler end of the rotary kiln 1. As the kiln rotates the charge tumbles toward the lower hot end where heat is supplied from combustion chamber 2 by flame 3. These calciners are brick lined steel cylinders about 8–10 ft. in diameter and 150–200 ft. long mounted on riding rolls which permit rotation. By the time the pigment reaches the portion of the kiln shown in the drawing where temperatures may range from 850° C. to 1200° C., water, sulfuric acid, and most other volatile substances have been driven out to the stack. However, the pigment will still contain small amounts of black carbonaceous materials in spite of the high temperature and the excess of hot air which is continually present over the pigment. Somehow, this carbon escapes oxidation during the several hours of contact with air in the calcination temperature range. Because of this carbon, the product pigment has a color or whiteness rated in the 15 to 18 range. The introduction of the oxygen or the other suitable oxidizing agents directly into the gas stream of the calciner of the drawing would be effective, but due to the tremendous volume of gases passing through, the large amounts of oxidizing agent required would be unduly expensive. Therefore, the hot calcined pigment is discharged from the kiln over lip 4 and passed down chute 5 into a rotating treatment container 6 constructed like a miniature kiln. In an operation producing 40 tons per day of pigment, this treating zone would be designed to retain about 1000 pounds of pigment thus giving approximately a 15 minute retention and exposure to oxidizing agents such as $SO_3$ introduced through spray head 7 via pipe 8. A fine continuous or intermittent spray of strong sulfuric acid or oleum provides the preferred source of $SO_3$. A satisfactory amount of $SO_3$ lies in the neighborhood of from 0.1 to 1.0 pound per 100 pounds of pigment. The normal draft from the pigment cooler 9 carries the unreacted fumes upward into the kiln 1 and they eventually pass out the stack and at the upper end of the kiln. The treating container 6 may be heated so as to aid the oxidation reaction. Electrical heating is preferred since further carbon contamination is avoided. Following the $SO_3$ treatment the pigment is discharged into cooler 9 and thereafter processed into a commercial pigment by conventional methods. As a result of using this invention, the whiteness of anatase pigment will be 2 to 5 points higher than that produced without using the invention. This invention will give an improvement of about 2 points of whiteness when the pigment is rutile.

The brick linings used are adequately resistant to $SO_3$ action. The chute 5 and sealing baffles 10 may be of structural steel and faced with small interlocking brick. Fused silica is very satisfactory from the corrosion standpoint and may be used for the chutes and for introducing the $SO_3$ or other agent. The brick lining of the container 6 is made thick enough to help keep the temperature of the pigment from falling too rapidly.

A minimum temperature in the order of 500 to 600° C. for the pigment leaving the treatment zone is desired to prevent adsorption of acid on the pigment as it goes to the cooler. The preferred temperature of the pigment during the treatment is between 1000° and 850° C. The treatment is effective at temperatures above 850° C. on either the heating or cooling stage of the cycle.

Other arrangements of equipment may also be used. For example, in the attached drawing the oxidation chamber may be made integral with the rotary cooler and the space within each of these sections may be separated by a brick dam and suitable fume barriers. As another alternative, the kiln may discharge into a brick-lined hopper in which an atmosphere of $SO_3$ or other oxidant is maintained. The hopper then discharges the treated pigment to a cooler.

The oxidizing agents may be introduced by any suitable means. They may be piped in from the pigment discharge ports as shown in the drawing or pipes carrying them may be passed through or around the feed chutes or through the side wall of the oxidation chamber. The last method is especially useful when a hopper is used since the oxidant could be introduced through a side wall above the bottom outlet and a slow updraft of air from the outlet would prevent the oxidizing agent from entering the cooler.

Oxygen is the cleanest of the oxidizing agents with respect to corrosion but others, such as $SO_3$ and $NO_2$, are more efficient. The treatment atmosphere may comprise substantially all oxidizing agent. It is more practical, however, to maintain an effective concentration of the agent in the atmosphere of the treating zone. In practical operation, the air draft is kept to a minimum and the concentration of the agent kept at levels which provide a greater effective oxygen atom concentration than does air. This concentration can be attained with such oxidizing agents as $O_2$, $SO_3$, $NO_2$, $NO$, $N_2O_3$, $N_2O_5$, nitric acid, sulfuric acid, and their mixtures including oleum. Air has an oxygen content of about 20% by wgt. and at this level it is ineffective in removing all of the contaminating carbon. However, the specified agents, which are all richer in oxygen than air, result in a marked improvement in whiteness.

When the pigment is ready for treatment according to this invention, it is usually in contact with an atmosphere comprising air or air mixed with combustion gases, $CO_2$, and $H_2O$. The agents of this invention are substituted for this atmosphere until it contains from 25 to 100% by wgt. of the agent or agents added. Higher concentrations are more effective but practical considerations may dictate the use of less than maximum for reasons of economy, and control of corrosion.

The process of this invention is applicable to any inorganic, titanium dioxide-containing, white pigment material which is usually calcined in the presence of air. This class includes the pure titanium dioxide pigments, anatase, and rutile, as well as their blended mixtures with white inorganic extenders, such as calcium sulfate, silica, clay, etc.

I claim:

1. A method for improving the whiteness of an inorganic titanium dioxide-containing pigment material contaminated with minute, discoloring amounts of carbonaceous matter which comprises contacting said material at temperatures between about 850° C. and the usual maximum calcination temperature for said pigment material and not above 1200° C. with an atmosphere inert to the pigment material and made richer in oxygen than air by the addition thereto of an oxidizing agent in an amount which constitutes 25–100% by weight of said atmosphere, said oxidizing agent being selected from the group consisting of elemental oxygen, higher oxides of nitrogen, higher oxides of sulfur, nitric acid, sulfuric acid, oleum and mixtures thereof.

2. A method for improving the whiteness of an inorganic titanium dioxide-containing pigment material contaminated with minute, discoloring amounts of carbonaceous matter which comprises contacting said materials at temperatures between about 850° C. and the usual maximum calcination temperature for said pigment material and not above 1200° C. with an oxidizing atmosphere inert to the pigment material and made richer in oxygen than air by the addition thereto of an oxidizing agent in an amount which constitutes 25–100% by weight of said atmosphere, said oxidizing agent being selected from the group consisting of elemental oxygen, higher oxides of nitrogen, higher oxides of sulfur, nitric acid, sulfuric acid, oleum and mixtures thereof and replacing said richer atmosphere with air before cooling the pigment below about 600° C.

References Cited in the file of this patent

UNITED STATES PATENTS

| 2,286,882 | Von Bichowsky et al. | June 16, 1942 |
| 2,397,430 | Pall | Mar. 26, 1946 |
| 2,792,287 | Moore et al. | May 14, 1957 |
| 2,865,622 | Ross | Dec. 23, 1958 |

OTHER REFERENCES

Barksdale: Titanium, The Ronald Press Co. (1949), pages 247–248.